Figure 1:
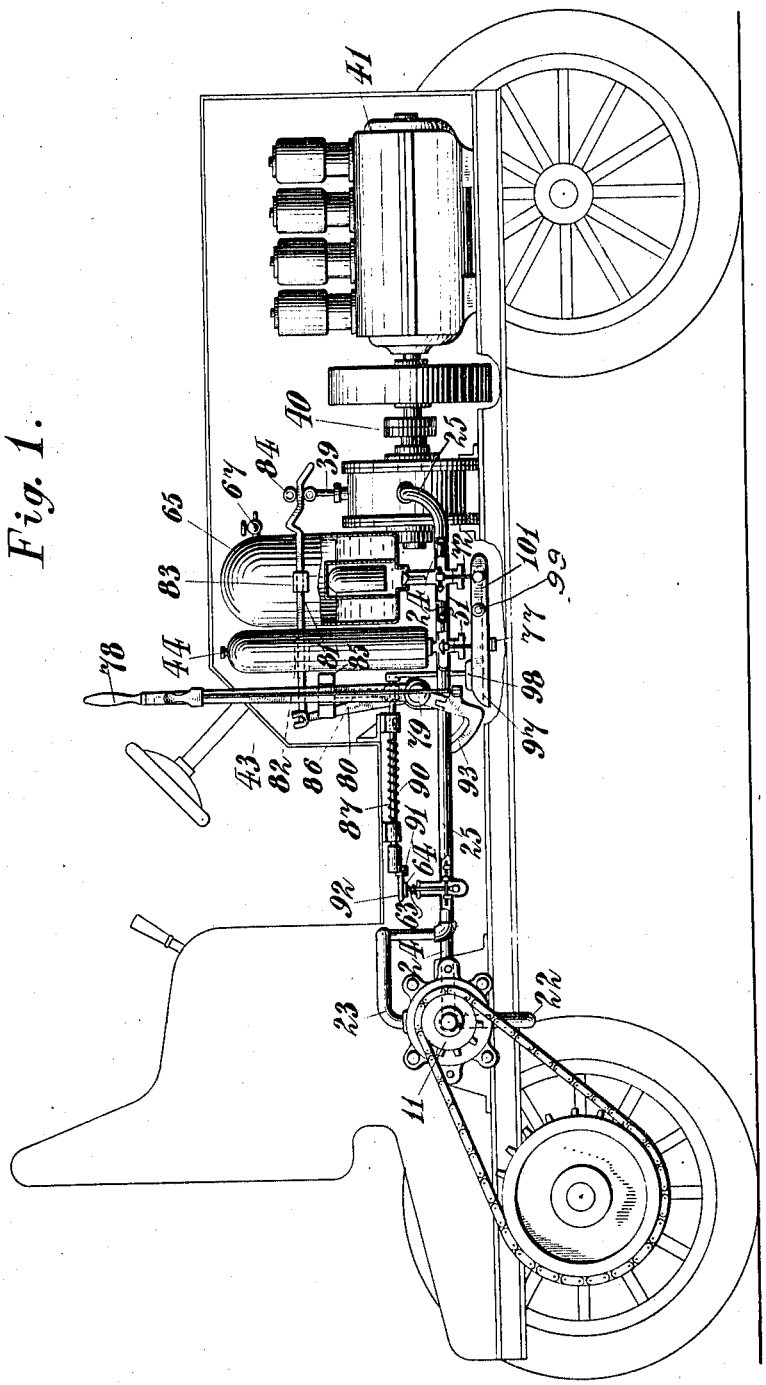

C. J. COLEMAN.
HYDRAULIC TRANSMISSION MECHANISM FOR AUTOMOBILES.
APPLICATION FILED DEC. 14, 1906.

993,652.

Patented May 30, 1911.
6 SHEETS—SHEET 1.

Witnesses
Wm. A. Kelly
Bernard Cowen

Inventor
Clyde J. Coleman
By his Attorney
Henry D. Williams

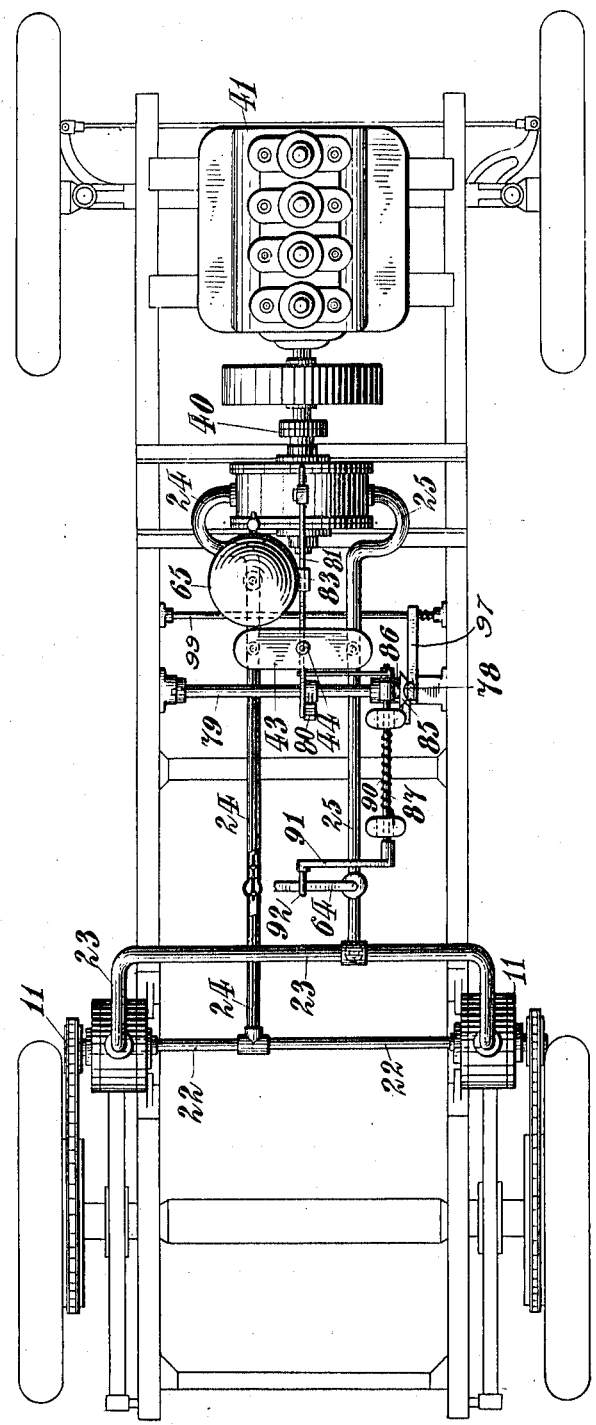

C. J. COLEMAN.
HYDRAULIC TRANSMISSION MECHANISM FOR AUTOMOBILES.
APPLICATION FILED DEC. 14, 1906.
993,652.
Patented May 30, 1911.
6 SHEETS—SHEET 3.
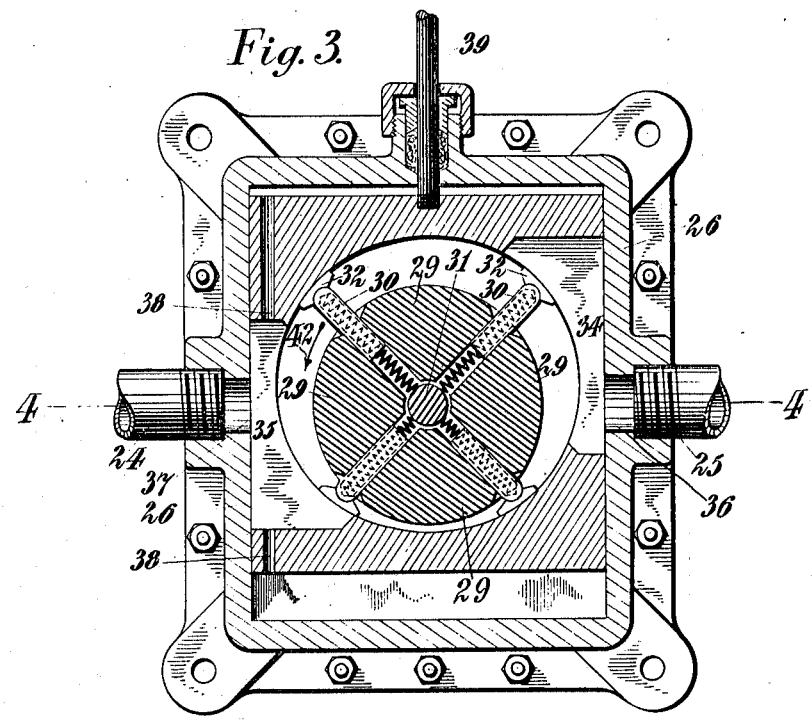
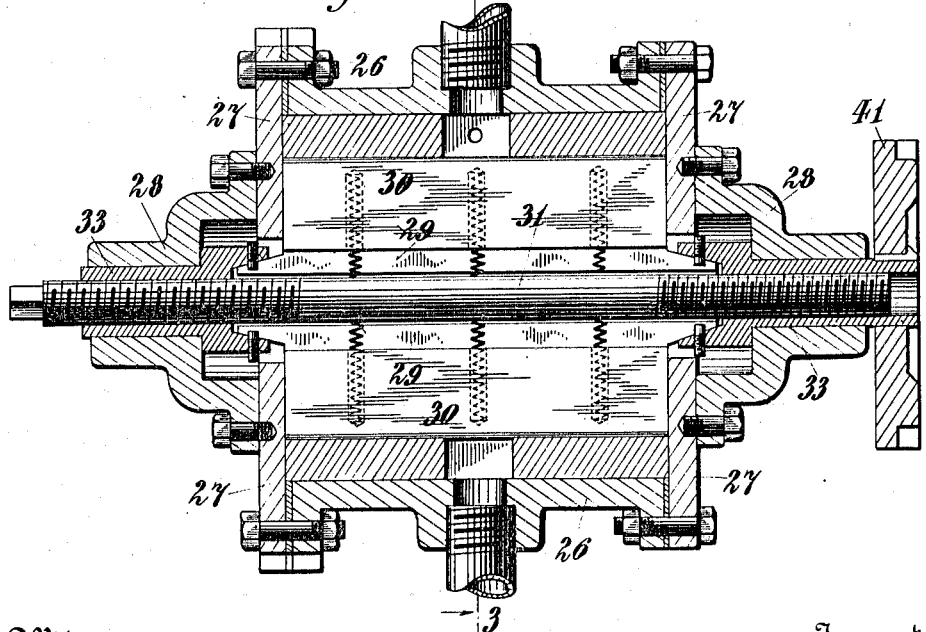

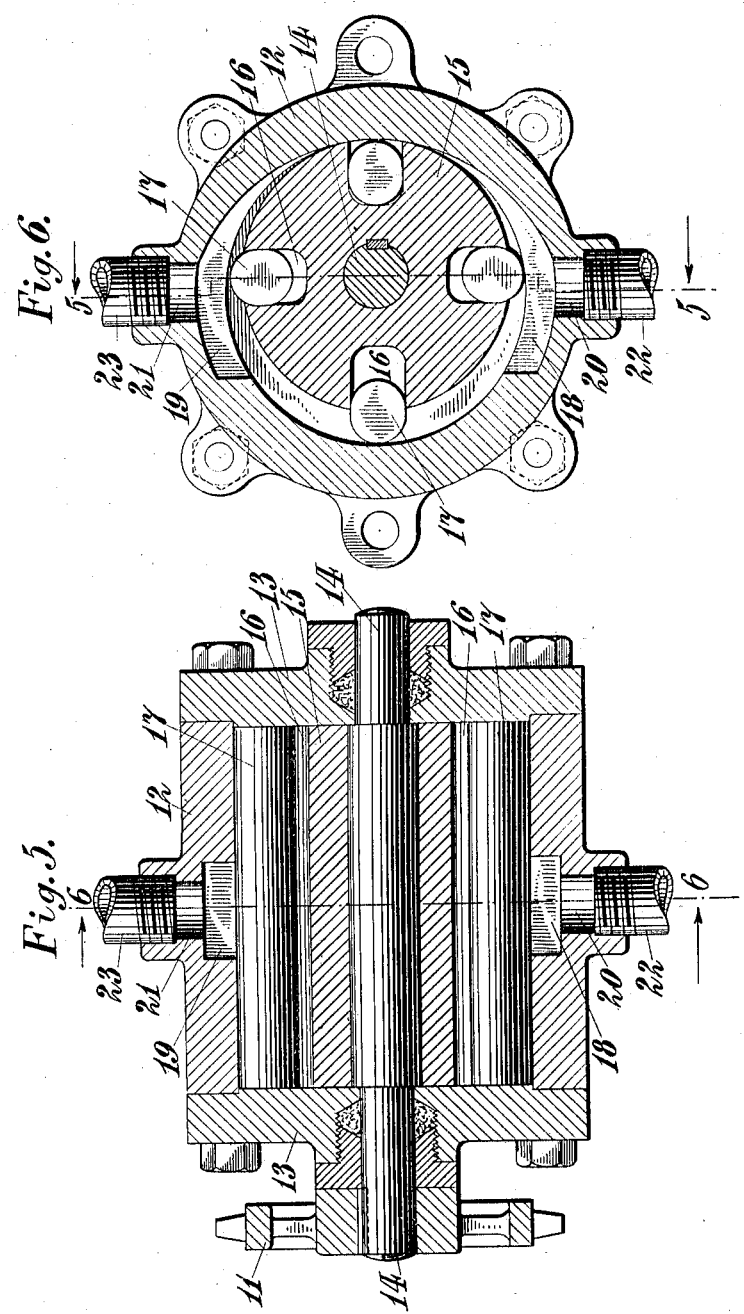

C. J. COLEMAN.
HYDRAULIC TRANSMISSION MECHANISM FOR AUTOMOBILES.
APPLICATION FILED DEC. 14, 1906.

993,652.

Patented May 30, 1911.

6 SHEETS—SHEET 5.

Witnesses
Wm. A. Kelly
Bernard Lowen

Inventor
Clyde J. Coleman
By his Attorney
Henry D. Williams

UNITED STATES PATENT OFFICE.

CLYDE J. COLEMAN, OF NEW YORK, N. Y., ASSIGNOR TO CONRAD HUBERT, OF NEW YORK, N. Y.

HYDRAULIC TRANSMISSION MECHANISM FOR AUTOMOBILES.

993,652.   Specification of Letters Patent.   Patented May 30, 1911.

Application filed December 14, 1906. Serial No. 347,895.

*To all whom it may concern:*

Be it known that I, CLYDE J. COLEMAN, a citizen of the United States, residing in the borough of Manhattan, city of New York, in the county of New York and State of New York, have invented certain new and useful Improvements in Hydraulic Transmission Mechanisms for Automobiles, of which the following is a specification, reference being had therein to the accompanying drawings, forming a part thereof.

My invention relates to hydraulic power transmission mechanisms for automobiles and other motor vehicles, and has for its objects economy and simplicity of construction, economy and simplicity of maintenance, and durability, reliability, efficiency and simplicity of operation.

I propose to substitute a hydraulic mechanism for the commonly employed clutches, universal joints, equalizing gears and sliding change-of-speed gears or planetary transmission gears or other numerous transmission devices heretofore used. The engine itself may be controlled in the usual manner, my present invention relating only to what is commonly known as the "transmission."

My invention includes, as features of the hydraulic transmission mechanism, a braking device, engine-starting means, a combined variable-capacity and reversible-delivery driving pump, means for automatically renewing any lost motive liquid, and a single manually operatable controlling lever.

In the embodiment of my invention shown, there are two rotary hydraulic motors, one connected to drive a traction wheel at each side of the vehicle. Two service conduits are provided, each connected to the motors in multiple or parallel relation through branches constituting equalizing ducts. The service conduits at their other ends are respectively connected to the service ports of a rotary hydraulic pump. The pump has its piston rigidly coupled to the shaft of the engine. The cylinder of the pump is movable transversely to the axis of the piston, so as to vary the relative eccentricity, or to produce an eccentricity in an opposite direction, as may be desired. When no eccentricity exists between the pump cylinder and its piston, the engine will revolve the pump piston idly, no liquid being passed through the pump, and the motors therefore not being operated, although the engine is running. This corresponds to releasing the usual clutch by which the engine is disconnected from its load. It is apparent that when the piston has eccentricity in one direction the motive liquid will be delivered through one of its service ports to rotate the motors in a direction to drive the vehicle forward, and that when eccentricity exists in the opposite direction the liquid will be delivered through the other port and rotate the motors in a reverse direction for backing the vehicle. To guard against any shortage of motive liquid and the consequent formation of vacua, I provide a renewal tank containing a surplus supply of motive liquid and communicating through outwardly opening check valves with both of the service conduits. To prevent the locking of the vehicle wheels when the pump cylinder and piston are concentric, means are provided for holding these renewal tank valves open at that time, so as to provide a cross connection or by-pass between the two service conduits through the tank. Braking upon the motive liquid without danger of cutting off the supply thereof to the motors is made possible by employing a partly-closable check-valve placed in each of the service conduits between its connection with the tank and the corresponding equalizing duct, both of these valves being arranged to open toward the motors and away from the tank. These valves are normally held open, but to produce a braking effect are gradually released, whereupon the motive liquid flowing away from the motors will partly close the valve through which it passes while the motive liquid flowing toward the motors will hold the other check valve open, thus producing a like braking effect in a forward or backward direction of movement of the vehicle. For starting the engine a pressure reservoir is provided which communicates with the service conduit which constitutes a pressure supply pipe for the motors when the vehicle is traveling in a forward direction. This reservoir receives liquid from the conduit during the normal operation of the engine in propelling the vehicle, a check-valve retaining the liquid thus received. Besides the liquid, the reservoir contains air under a high minimum pressure. When starting the engine, the check-valve of the reservoir and also the check valve between the other service conduit and the tank are both held open, permitting motive liquid to flow from the reservoir through the pump in a reverse direction and into the renewal tank which thus also constitutes an overflow tank. The motive liquid from the reservoir is prevented from acting upon the motors by a check valve which is normally held open but which is released just previously to the opening of the check valve for the reservoir. The compressed air is prevented from escaping from the reservoir by an automatically acting valve which always retains a liquid seal in the reservoir. In starting the engine, the eccentricity of the pump piston is made such that the pump acts as a motor to start the engine. A single manually operatable lever is arranged to operate all the aforementioned mechanisms in their proper sequence.

The embodiment of my invention shown will now be particularly described by reference to the accompanying drawings after which I will point out my invention in claims.

Figure 7:
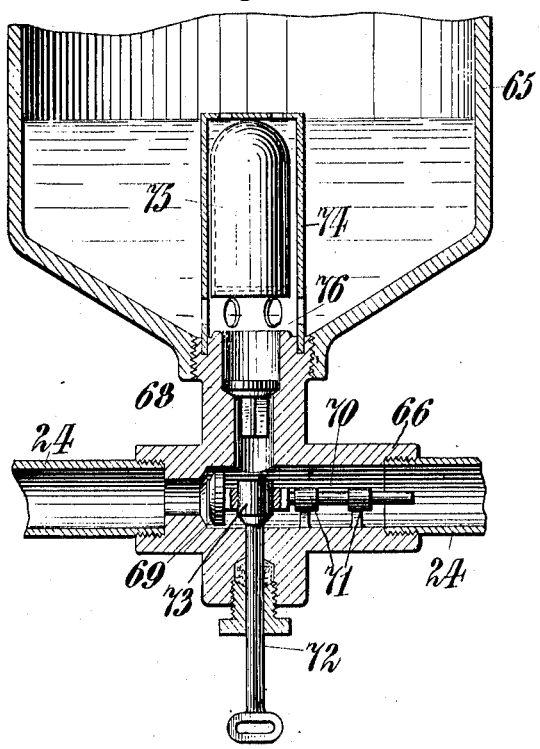
Figure 8:
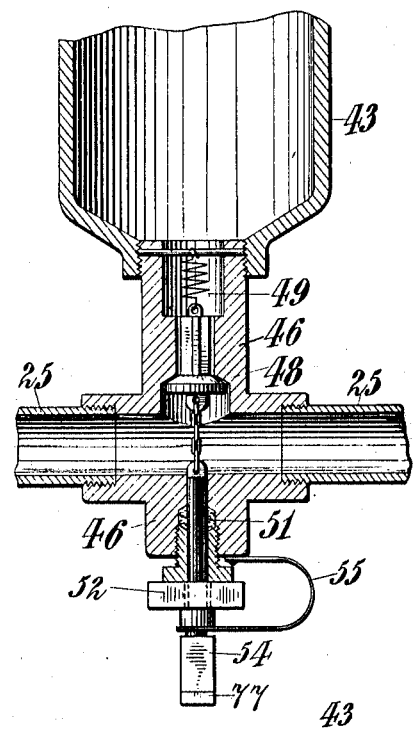
Figure 11:
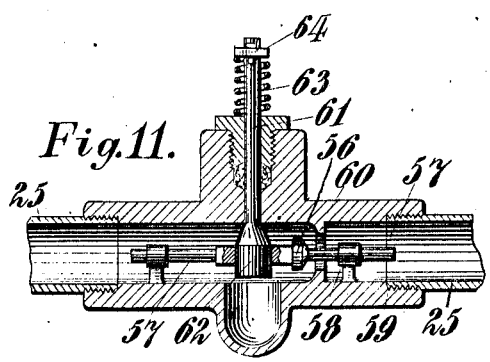
Figure 9:
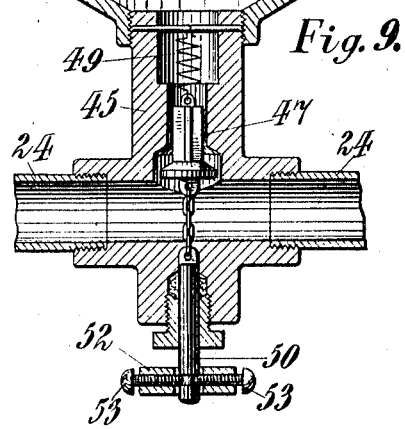
Figure 10:
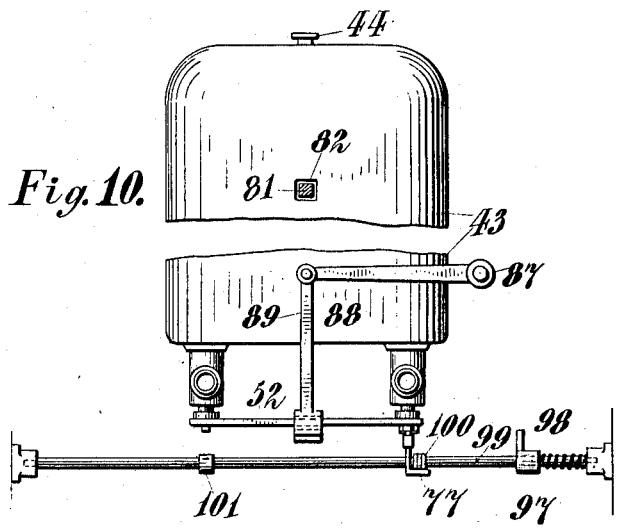
Figure 14:
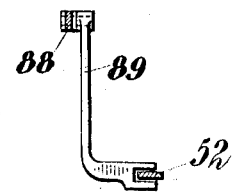
Figure 15:
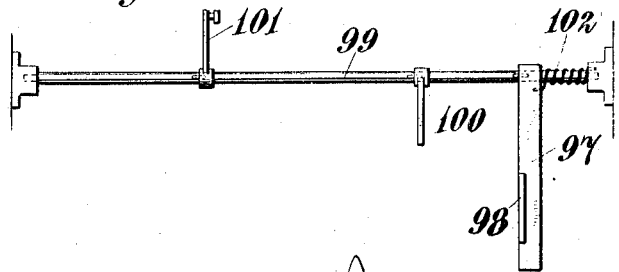
Figure 16:
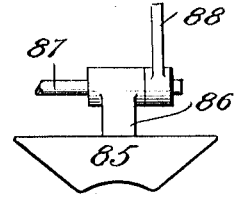
Figure 12:
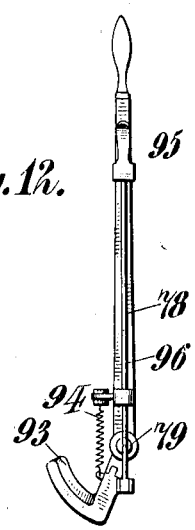
Figure 13:
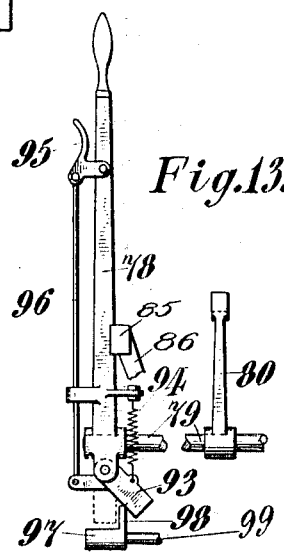

Figure 1 is a diagrammatic side elevation of a motor vehicle with my invention applied thereto. Fig. 2 is a diagrammatic plan view of the same. Fig. 3 is a transverse sectional elevation of the pump shown as employed for impelling the motive liquid, the view being taken on the line 3—3 of Fig. 4, looking toward the right, excepting that in Fig. 3 the rotary piston is shown as turned through an angle of forty-five degrees from the position it is shown as occupying in Fig. 4. Fig. 4 is a sectional plan on the line 4—4 of Fig. 3, excepting that the piston is angularly shifted from the position shown in Fig. 3. Fig. 5 is a longitudinal sectional elevation of one of the hydraulic motors shown as employed for propelling the vehicle, the view being taken on the line 5—5 of Fig. 6 as viewed from the right. Fig. 6 is a transverse sectional elevation on the line 6—6 of Fig. 5, looking toward the right. Fig. 7 is a vertical section of the pressure reservoir shown as employed for starting the engine, portions being broken away. Fig. 8 is a vertical section of the supply or renewal tank taken longitudinally of that service conduit which is not connected to the pressure reservoir, portions being broken away. Fig. 9 is a vertical section of the renewal tank, with portions broken away, taken longitudinally of the service conduit that is connected to the reservoir. Fig. 10 is a rear elevation, on a reduced scale, of the renewal tank and some contiguous parts, a portion of the tank being shown as broken out to save space. Fig. 11 is a vertical section longitudinally of a service conduit showing one of the braking valves, the view being taken from the right side of the vehicle as shown in Figs. 1 and 2. Fig. 12 is a side elevation of the controlling lever. Fig. 13 is a front elevation of the controlling lever and some of the parts actuated thereby. Fig. 14 is a side elevation of the link for simultaneously opening the two valves of the renewal tank to provide a by-pass therethrough. Fig. 15 is a plan view of the rock shaft and levers for actuating the various valves for starting the engine, when acted upon by the controlling lever. Fig. 16 is a plan view of the brake-actuating cam-block and some of the parts connected thereto.

In the embodiment of my invention illustrated in the accompanying drawings, the usual chain drive for the traction wheels is shown as employed, there being two separate hydraulic motors each shown as provided with a driving sprocket 11.

The motors shown as employed are of the rotary type, as may be seen by Figs. 5 and 6, and are adapted to be reversed as to direction of rotation, for propelling the vehicle forward or backward, by reversing the direction of flow of the motive liquid through the motors. As these two motors are substantial duplicates, it is only necessary that one be shown in detail and particularly described. Reference being had to Figs. 5 and 6, the motor is shown as having a cylinder 12 whose ends are closed by heads 13 held thereupon by bolts passing through lugs on the heads. One of the heads also has other lugs, as shown, for use in securing the motor in place. A shaft 14 passes eccentrically through the heads 13 and has its bearings therein made fluid tight by packing glands as shown. The shaft 14 carries the sprocket 11 fixed thereon as by a key as shown, and within the cylinder 12 and fitting closely between the heads 13 a rotary piston 15 is fixed upon the shaft 14 as by a key as shown. The piston is concentric to the shaft upon which it is mounted and is permanently eccentric to the cylinder. The piston is provided with longitudinal channels or grooves 16 within which are located rollers or cylindrical wings 17, the wings being adapted to move radially in the grooves and in operation being held in contact with the inner surface of the cylinder by centrifugal force. The cylinder is provided at opposite sides transversely with ports 18 and 19 communicating respectively with openings 20 and 21 to which are respectively connected pipes 22 and 23 constituting functionally interchangeable induction and eduction passages for the motor. As the ports 18 and 19 are intended to serve interchangeably as inlet or exhaust ports for rotating the piston in one direction or the other, they are in all respects duplicates of each other with the exception that they are reversed in their circumferential relation to the cylinder. These ports bear like but opposite relations to the piston and each is of a sufficient width to prevent trapping of the exhaust by the wings of the piston such as would lock the motor. To drive the motor in one direction, which may be considered as the forward direction, motive liquid is admitted through the pipe 22 and is exhausted through the pipe 23, and the motor is reversed by admitting the motive liquid through the pipe 23 and exhausting it through the pipe 22. Because of the permanent eccentricity between the motor piston and its cylinder it is evident that the same quantity of motive liquid per cycle or per revolution will at all times pass through the motor. This motor therefore constitutes a constant capacity hydraulic motor.

The motor illustrated in Figs. 5 and 6 may be considered as the motor shown at the right side of the motor vehicle in Figs. 1 and 2, and with this assumption it is evident that when motive liquid is admitted to the motor through the pipe 22, it will act to drive the vehicle in a forward direction. The motor at the left of the vehicle is similarly arranged with reference to the pipe 22, that is, so that motive fluid admitted thereto through the pipe will act to propel the vehicle forward. The pipe 23 is connected, as shown, to receive the exhaust from both motors when the vehicle is being driven forward. From the above it is evident that the pipes 22 and 23 constitute ducts or passages connecting together homologous ports of the two motors and therefore that they act as equalizing ducts between the two motors.

For driving the vehicle in a forward direction, motive liquid is delivered to the pipe 22 by a service conduit 24 which connects therewith, and exhaust takes place from the pipe 23 by a second service conduit 25 connected thereto. For backing the vehicle, the motive liquid is moved in a reverse direction through the conduits and pipes. It is thus evident that the two motors are connected to the service conduits in parallel or mutliple relation to each other.

For impelling motive liquid through the conduits and pipes to the motors the conduits at their forward ends are respectively connected to the functionally interchangeable inlet and outlet openings of a rotary hydraulic pump.

The pump shown has a rectangular casing comprising the side inclosure or frame 26 and the end pieces or heads 27 which form also cylinder heads for the pump. The side inclosure and the heads are united in a liquid-tight manner with interposed gaskets upon which they are drawn together by bolts as shown. Corner lugs with bolt holes are shown as provided for securing the pump in place. A cup-shaped shaft-bearing 28 is secured to each head 27 by tap-bolts. The pump-piston comprises four sector-shaped sections between which radially slide a corresponding number of outwardly spring-pressed wings 30, each wing being pressed outward by thrust-springs located in recesses in the wings and bearing against a common shaft 31. To reduce leakage, a shoe 32 is pivotally mounted upon the outer edge of each wing. The sections 29 have sloping ends as shown and are held in place and pressed against the face of the wings by flaring cup-shaped sleeves 33 which fit over the sloping ends of the sections. The piston sections and the sleeves are rotatably coupled together by screw-pins as shown passing through the flaring portions of the sleeves and extending between the sloping ends of the sections. The sleeves are brought toward each other to press upon the sloping ends of the sections by turning the shaft 31, which passes loosely between the piston sections and has differential screw-threads which engage with the respective sleeves, the shaft having one end squared to permit of making the adjustment referred to. The piston is rotatably supported in the bearings 28 by the sleeves 33.

The cylinder for the pump comprises a rectangular block slidable with a close fit in the casing transversely to the axis of the piston. The cylinder has a bore of larger diameter than the piston, exclusive of the wings, the shoes 32 of the wings being adapted to slide circumferentially within the bore. To vary the eccentricity of the piston and cylinder relatively to each other, the cylinder is slid toward one side or the other of the casing. An eccentricity in either one of two opposite directions may be produced by sliding the cylinder clear over past a middle position toward the other side of the casing, or all eccentricity may be eliminated and a concentric relation produced by stopping the cylinder at its middle position, and any desired degree more or less of such eccentricity in either direction may be produced by stopping the cylinder at any intermediate position. Functionally interchangeable ports 34 and 35 are provided in the cylinder at opposite sides thereof, that is, these ports are adapted to serve interchangeably as inlet and as delivery or exhaust ports for the pump. These ports are of sufficient width to at all times respectively register with corresponding openings 36 and 37 in the casing at any position of the cylinder. The service conduits 24 and 25, constituting functionally interchangeable induction and eduction passages of the pump, are respectively connected to the openings 36 and 37. As the ports in the cylinder are intended to serve interchangeably as induction and eduction ports, according to the position of the cylinder, while the piston always rotates in the same direction, these ports bear like circumferential relations to the bore of the cylinder. To prevent trapping of the motive liquid such as would lock the pump, those portions of the bore of the piston between the ports are portions of cylinders whose axes respectively coincide with the axis of the piston when the piston is at its diametrically extreme opposite position, and the ports are cut back far enough in the direction of rotation of the piston to prevent any such trapping of the exhaust. To allow the cylinder to slide freely in the casing, openings 38 are provided leading from one of the cylinder ports to the spaces between the cylinder and casing at opposite sides of the cylinder. To slide the cylinder to different positions in the casing an operating rod 39 is provided which is screwed into the cylinder and passes to the outside of the casing through a packing gland as shown. For coupling the pump piston to an internal combustion engine 41 (shown diagrammatically in Figs. 1 and 2), a coupling element 40 is shown as fixed by a key upon one of the sleeves 33. Whenever the engine is running the piston of the pump is continuously driven in the same direction, that direction being counter-clockwise as seen in Fig. 3 of the drawings and as there indicated by the arrow 42. As the piston always rotates in the same direction, it is evident that the direction of flow of motive liquid through the pump will be reversed by moving the cylinder from one to the other eccentric position relatively to the piston. It is also evident, and as already explained, that the direction of rotation of the motors, depends upon the direction in which the motive liquid is impelled through the service conduits by the pump. It is further evident from the preceding explanation that with the cylinder at its extreme upper position as seen in Fig. 3 the vehicle would be propelled at full speed ahead. It is yet further evident that the pump will deliver a less and less quantity of liquid as the eccentricity is reduced and that when the eccentricity is eliminated and the piston and cylinder are concentric no motive liquid at all will be passed through the pump but that the engine will run idly, revolving the piston freely in the cylinder.

In a closed circuit system such as has so far been described a shortage of motive liquid might occur, as, for example, from contraction due to variations in temperature or from leakage. To prevent any such shortage of motive liquid I provide means for automatically keeping the supply of motive liquid in use constantly and fully renewed. The means shown for this purpose comprise a renewal-tank 43 for containing a surplus supply or reserve supply of motive liquid and having at its top an opening 44 to the atmosphere. This renewal-tank is connected with the conduit 24 by a T-connector 45 and is connected with the conduit 25 by a similar T-connector 46. Communication between the renewal-tank and the conduits 24 and 25 is controlled by outwardly opening check valves 47 and 48 lightly retained upon their seats by thin springs 49. These valves provide an effectual seal against ingress of motive liquid from the conduits to the renewal-tank though freely opening to admit liquid by gravity from the tank to the conduits. It is obvious that motive liquid from the tank will only thus flow into the non-pressure or return conduit, that is, into the conduit which is returning the motive liquid to the pump and not into the conduit which is conveying motive liquid from the pump to the motors. Therefore were renewal means provided only in reference to one of the conduits, such means would fail to operate upon a reversal of the direction of flow of motive liquid in the conduits as occurs in reversing the motors to back the vehicle, as explained. By connecting the renewal-tank with both of the service conduits, renewal of the motive liquid will take place regardless of the direction of flow of the motive liquid through the conduits.

We come now to a consideration of the braking device. In this connection it should be noted that, in the construction described, were no remedy provided, the motors would become locked when the cylinder was concentric with its piston, because then no liquid could pass through the pump. However, for obvious reasons, it would be highly detrimental to brake in this manner; but it is important to have a brake which can be applied gradually and only when desired. Therefore, means are provided for opening a by-pass between the service conduits and in this manner shunting the motors just before the cylinder reaches its concentric position and for maintaining such by-pass open until the cylinder is slightly eccentric in a position beyond its concentric position; and braking means are provided which are active only while such by-pass is open. The means shown for opening such by-pass comprise actuating stems 50 and 51 for the respective renewal-tank valves 47 and 48, the stems being shown as connected to the valves by chains so as to allow the valves to freely open of their own accord when influenced by the weight of the liquid in the renewal-tank. The valves are opened at the proper time to cross-connect the conduits through the renewal-tank by a cross-bar 52 through which the valve stems pass. This bar is shown as operatively secured to the valve-stem 50 by actuating screws 53 which engage in a groove on the valve-stem as shown, and the bar is adapted to operate the valve-stem 51 by abutting against the head 54 thereof. The bar 52 actuates the valve-stem 50 in both directions, while it actuates the valve-stem 51 in only one, the outward, direction, the valve-stem 51 being shown as free to slide outwardly through the bar 52, thus permitting the valve 48 to be actuated by other means for other purposes presently to be described. The valve-stem 51 is actuated in the other, the inward, direction of movement by a rectractile bow-spring 55, shown as secured at one end by a screw to the connector 46 and having its other end engaging in a groove in the valve-stem-head 54. Too great inward movement of the valve-stem in each instance is prevented by contact of the bar 52 with the connectors 45 and 46. The means for actuating the bar 52 at the proper time will be described presently. In the drawings, Fig. 8 shows the valve 48 in closed position, while in Fig. 9 the valve 47 is shown as held open by the bar 52.

The braking means comprise braking valves of a special construction introduced into the service conduits 24 and 25 between their connection with the equalizing ducts 22 and 23 and with the tank 43. These braking valves are normally held widely open, but when released operate on the principle of check-valves, under the influence of the motive liquid and are arranged in the conduits so as to open widely in a direction toward the motors and away from the tank 43 and to partly close in the opposite direction under the influence of the motive liquid. The manner of arrangement of these valves in the conduits may be seen from Figs. 1 and 2.

As the two braking valves are in all respects alike, a detailed description of one will serve for both, reference now being had to Fig. 11 for this purpose. A valve-head 56 has a stem 57 which is slidably supported in bearings 58 shown as integral with a connector 59. The connector 59 is provided with a reduced bore at 60, and the valve-head 56 is shown as of slightly smaller diameter than this reduced bore, so that the valve-head can never seat thereupon but can only approach near thereto, thus producing a choking effect and restricting the flow of liquid without forming a complete closure so as to completely cut off the passage of motive liquid. The valve-head 56 is normally held at some distance from the restricted bore 60 by a brake-actuating stem or rod 61 having a sliding bearing through a packing gland as shown. The rod 61 has an enlarged portion 62 at its inner end which normally seats in a corresponding opening in the valve-stem 57 and acts then, as shown in Fig. 11, to hold the valve at its most widely open position. When the valve is in this phase, the motive liquid has substantially an unrestricted passage through both of the conduits 24 and 25 in either direction, and therefore when the valve is in this phase no braking effect can take place. The brake-valves are normally maintained in this non-operative phase by expansion springs 63 coiled about the rods 61 and acting against a bar 64 which extends between the two rods 61 and is held in place upon these rods by cotter-pins as shown. When the rod 61 is depressed against the tension of the spring 63 then the valve 56 is left free either to remain widely open or to assume its most nearly closed position according as it is influenced by the movement of the motive liquid in the conduits. This result takes place by reason of the reduced portion of the rod 61 then entering the enlarged aperture in the valve-stem 57. When the rod 61 is released then the spring 63 restores it to its normal position and the valve 56 will again be locked in widely open position by the enlarged end 62 of the rod 61 entering the opening in the valve-stem 57. The enlarged end 62 is joined to the stem portion of the rod 61 by an intermediate sloping portion as shown, this sloping portion acting as a cam to move the valve-stem 57 to force the valve to its most widely open position, and also acting when the rod is moved in the opposite direction to permit a gradual closure of the valve under the influence of the motive liquid. The means for actuating the bar 64 to release the valves 56 are to be described presently.

From the above description it is evident that if the renewal tank-valves 47 and 48 be held open to cross-connect or provide a by-pass between the conduits 24 and 25, and the braking valves 56 be then released, a braking effect upon the motors will result which I will now describe. At this time the pump-cylinder will have been moved to a concentric relation to its piston, as will presently appear, but irrespective of this, the motors could receive no motive liquid on account of the cross-connection or by-pass existing between the service conduits. Assuming that the vehicle has a tendency to go ahead, as by its own momentum or gravity, the motors will act as pumps, drawing liquid from the tank 43 through the conduit 24 and delivering the liquid back to the tank 43 through the other conduit 25. Although both braking valves are free to open or close, the valve in the conduit 24 remains open because it opens in the direction in which the liquid is flowing, while the valve in the conduit 25 has a tendency to close and does close to the extent that it is permitted because it closes in the direction of movement of the liquid. Thus the braking is done solely on the liquid that is flowing away from the motors. Were a braking effect exercised upon the liquid in the conduit 24 the motive liquid would be held back from the motors (now acting as pumps), and as the motors would deliver what liquid they contained through the conduit 25 to the renewal-tank, which is open to the atmosphere, the tendency would be for a vacuum to be produced in the motors and which would destroy the braking effect altogether. It is obvious without further explanation that were the vehicle moving backward, had it a tendency to do so, the action of the braking valves in reference to the motors would be reversed. The braking effect may be made ever so gradual by gradually pushing in the valve-controlling rods 62 so as to equally gradually release the braking valves as their stems gradually slide along the cam portions of the rods.

The engine-starting means comprise a pressure reservoir 65 communicating with the service conduit 24 through a T-connector 66, it being noted that 24 is the pressure supply conduit from the pump for the motors when the vehicle is driven in a forward direction. This pressure reservoir is adapted to contain motive liquid and also contains, above the liquid, air under a high pressure, the reservoir being provided with a stopcock or hand-valve 67 through which the reservoir may be charged with compressed air. An inwardly opening check-valve 68 in the connector 66 controls the communication between the reservoir and the conduit 24. Flow of liquid in the conduit 24 is controlled by a puppet-valve 69, this valve normally being held open, so as to provide a substantially unrestricted passage for the motive liquid through the conduit 24. The valve 69 has a stem 70 slidably supported in bearings 71 shown as integral with the T-connector 66. The valve 69 is normally held open by an actuating rod 72 the enlarged end 73 of which enters an opening in the valve stem 70 as shown. The enlarged portion 73 tapers down to the smaller portion or stem of the rod 72 as shown and acts upon the valve-stem 70 as a cam to force open the valve 69 or to permit it to close according as the enlarged or the stem portion of the rod is located within the aperture of the valve-stem. Under the normal operation of the engine in driving the vehicle, the puppet-valve 69 then being open, motive liquid will be forced from the conduit 24 through the check-valve 68 into the pressure reservoir and there stored until the pressure within the pressure reservoir balances that in the pressure supply conduit 24. To save weight and space upon the vehicle it is intended that the pressure reservoir 65 shall be of relatively small capacity and that the motive liquid shall be stored therein under a very high minimum or initial pressure. Such minimum pressure is much above that of the atmosphere and should always be at least sufficient for engine starting operations. To retain the compressed air in the reservoir under this minimum pressure an automatic device is provided for always retaining a seal of liquid in the reservoir. This device is shown as comprising a perforated cage 74 covering the outlet of the reservoir and inclosing a combined float and sealing valve 75 for coacting with a valve-seat 76. Normally the sealing valve is buoyed up by the liquid in the reservoir, but if the contained liquid falls low the valve will settle upon its seat and form a seal against further escape of liquid and therefore against any escape of compressed air.

To start the engine, the check-valve 68 is held open so as to permit the stored motive fluid to pass from the reservoir into the conduit 24, the puppet-valve 69 having been released so as to be free to close to prevent the passage of motive liquid from the reservoir to the motors, as that would be wasteful of the stored liquid and otherwise undesirable. To permit such closure of the puppet-valve and to open the check-valve 68, the valve-actuating rod 72 is pushed inward by manual means presently to be described, this rod extending out through a packing gland as shown. When the rod 72 is pushed inward the conduit-controlling valve 69 is first released by the rod-enlargement 73 which disengages the stem thereof, and then the reservoir controlling check-valve 68 is pushed open by the inner end of the same rod. The stored motive liquid passes from the reservoir by way of the conduit 24 to the pump, for operating the pump as a motor to start the engine. As the engine-starting liquid enters the pump from the conduit 24, which is the discharge conduit for the pump when the engine is driving the vehicle forward, it is evident that to cause the piston to rotate in its proper direction to start the engine the pump must be set at the "reverse" position, that is, the piston and cylinder must at this time be oppositely eccentric to the position shown in Fig. 3. There must of course be some means of escape or exhaust for the engine-starting liquid after it has passed through the pump, and to this end the renewal-tank-valve 48 which controls communication with the conduit 25 is held open during the engine-starting operation. This permits the exhaust engine-starting liquid to flow into the renewal-tank which thus constitutes an overflow-tank for this liquid. The valve stem 51 is shown as provided at its lower end with a projection or step to be acted upon by means presently to be described for opening the valve 48 during the engine-starting operation. It is evident from the above that to start the engine the pump is thrown to the "reverse" position, the combined reservoir valve-actuating and conduit valve-actuating rod 72 is pushed inward and at the same time the overflow-tank valve-actuating stem or rod 51 is drawn outward.

The single manually operatable means for starting and stopping the vehicle, for reversing the direction of travel of the vehicle, for actuating the brake, and for actuating the engine-starting means will now be described.

A hand-lever 78 is fixed upon a rock-shaft 79 shown as pivoted in bearing brackets carried by the vehicle frame. Simple backward and forward manipulations of this one lever accomplish all of the above named results, each at the proper or desired time, as will presently appear. In the drawings the lever 78 is shown as occupying a middle or what may be called its neutral position. For controlling the pump so as to regulate the relative eccentricity of the piston and cylinder, the rock-shaft 79 has fixed thereon a slotted arm 80 which at its upper slotted or forked end pivotally engages with a slidable cam-bar 81 for actuating the cylinder-operating rod 39. This cam-bar is shown as slidably guided substantially in a right line by a guiding sleeve 82 passing through the combined renewal, overflow and cross-connecting tank 43 and by a guide-bracket 83 carried by the pressure reservoir 65. This cam-bar passes between two anti-friction rollers 84 carried by the cylinder-operating rod 39. The cam-bar is shown as provided with a neutral portion disposed between an upwardly inclined actuative portion and a downwardly inclined actuative portion. When the horizontal or neutral portion of the cam-bar is engaged with the rollers 84, as shown in the drawings, it is evident that the pump cylinder will bear a concentric relation to its piston and that therefore the engine may rotate idly. To cause the vehicle to move forward, the hand-lever should be moved forward until the upwardly inclined cam engages the rollers 84 to raise the cylinder-rod 39 and the pump-cylinder carried thereby. The cylinder may in this way be gradually raised to the extreme position seen in Fig. 3. To drive the vehicle backward, the hand-lever should be moved backward until the downwardly inclined cam engages the anti-friction rollers to shift the cylinder downward past its neutral position, producing an opposite eccentricity to the piston.

The brake is actuated by the hand-lever 78 during the time that the neutral or non-actuative portion of the cam-bar 81 is engaged between the anti-friction rollers 84, that is to say, during the time that the pump-cylinder is maintained at a concentric relation with its piston. To actuate the brake at this time and to provide a by-pass for the motors previously thereto and previously to producing the concentric relation of the pump-piston and cylinder, the hand-lever 78, just previously to either of the cam-portions of the cam-bar leaving the anti-friction rollers, engages with a cam-block 85 carried at the upper end of an arm 86 fixed upon a counter-rock-shaft 87 shown as pivotally supported in bearings carried by the machine frame. For opening the by-pass previously referred to herein, a substantially horizontal arm 88 is fixed upon the counter-rock-shaft 87 and is pivoted to a substantially vertical link 89 having a depending slotted or forked foot portion extending perpendicularly therefrom and engaging with the renewal-tank valve-actuating cross-bar 52. This bar 52 is normally held at its uppermost position by a torsion spring 90 coiled about the counter-rock-shaft 87 and acting thereupon. For applying the brake, a substantially horizontal crank-arm 91 is fixed upon the brake-valve and renewal-tank valve-actuative rock-shaft 87 and carries a pin 92 for engaging with the brake-valve-bar 64 to press such bar down against the tension of the springs 63 to release the braking valves 56, in the manner hereinbefore explained. A small amount of lost motion is provided between the crank-pin 92 and the brake-valve-bar 64 so that the brake will not be applied until after the piston cylinder has become concentric and the by-pass through the renewal-tank has been opened. By moving the hand-lever gradually toward the middle point of its neutral or middle position, the braking effect may be produced as gradually as desired, the braking valve stems then sliding slowly down the inclined or tapered portions of the rods 61. As the lever-actuated cam-block 85 has double cam-faces, it is actuated in the same manner regardless of the direction of movement of the hand-lever. This cam-block is shown as slightly recessed or hollowed out between its cam-faces, and the hand-lever is shown as rounded for seating in the hollow, thereby securely retaining the hand-lever at the middle point of its middle position when it is stopped there.

For starting the engine, the hand-lever 78 is provided with a cam-foot 93 pivoted to swing laterally to the lever into and out of alinement therewith (as best seen in Fig. 13). The cam-foot is normally held out of alinement by a retractile spring 94 and may be brought into alinement by a hand-latch or grip-lever 95 to which it is connected by a shifting-rod 96. If the lever 78 be moved backward away from its middle or neutral position while the cam-foot 93 is in alinement therewith, the cam-foot will engage with a cam-lever 97 which is located in lateral alinement with the lever 78, such cam-lever being provided with an interlocking flange 98 for holding the cam-foot in alinement after the lever 78 has been moved away from its middle position and until such lever is returned to its middle position. The interlocking position of the cam-foot is indicated by dotted lines in Fig. 13. The cam-lever 97 is fixed on a cross-shaft 99 shown as pivoted in bearings supported by the vehicle frame. For actuating the valve-stems 51 and 72, the cross-shaft 99 carries two diametrically oppositely projecting arms 100 and 101, the arms 100 engaging with the top side of the L or foot 77 of the valve-stem 51 and the arm 101 carrying a stud as shown for engaging in a slotted hole at the lower end of the stem 72. When the cam-lever 97 is engaged by the cam-foot 93 it will be moved downward, thereby drawing downward the stem 51 and opening the overflow-tank valve 48 and at the same time pushing inward the stem 72 to open the reservoir valve 68 and to permit the conduit-controlling valve 69 to close, the result being to start the engine, as hereinbefore explained. To start the engine, the latch 95 is depressed and then the hand-lever 78 is moved backward, and as soon as the engine has started the hand-lever is thrown forward and is stopped at its middle position if it is not desired to start the vehicle, but if it is desired to start the vehicle in a forward direction, then the lever 78 may be pushed past its middle position and over to its forward position. When the cam-lever 97 is released by the cam-foot 93 it will be restored to its normal phase by a torsion spring 102 coiled about the cross-shaft 99 and engaging with the cam-lever and with the adjacent supporting bearing of the cross-shaft. When the cam-lever is restored to its normal phase the arm 100 will permit the overflow-tank valve 48 to be restored to its normal or closed position by the spring 55 and the arm 101 will pull out the stem 72 permitting the reservoir controlling check valve 68 to close and forcing the conduit-controlling puppet-valve 69 to its normal or open position.

It is obvious that various modifications may be made in the construction shown and above particularly described within the principle and scope of my invention.

I claim:

1. The combination, with a hydraulic motor, of physically distinct and functionally interchangeable induction and eduction passages, and a brake having a member in each passage constructed and arranged to act upon the motive liquid in whichever of the passages that acts as an eduction passage and not to act upon the motive liquid in the other passage which acts as an induction passage, irrespective of the direction of flow of the motive liquid through the passages and motor.

2. The combination, with a hydraulic motor, of physically distinct and functionally interchangeable induction and eduction passages, a source of motive liquid with which the passages communicate, and a brake having a member in each passage constructed and arranged to act upon the motive liquid in whichever of the passages that acts as an eduction passage and not to act upon the motive liquid in the other passage which acts as an induction passage, irrespective of the direction of flow of the motive liquid through the passages and motor.

3. The combination, with a hydraulic motor, of physically distinct and functionally interchangeable induction and eduction passages, means for exposing the motive liquid in the passages to atmospheric pressure, and a brake having a member in each passage constructed and arranged to act upon the motive liquid in whichever of the passages that acts as an eduction passage and not to act upon the motive liquid in the other passage which acts as an induction passage, irrespective of the direction of flow of the motive liquid through the passages and motor.

4. The combination with a hydraulic motor, of functionally interchangeable induction and eduction passages, a hydraulic pump for impelling motive liquid through the passages for operating the motor, a tank normally sealed against ingress of motive liquid from the passages, means for cross-connecting the passages through the tank, and a brake constructed and arranged to act upon the motive liquid flowing away from the motor and not to act upon the motive liquid flowing toward the motor, irrespective of the direction of flow of the motive liquid.

5. The combination with a hydraulic motor, of functionally interchangeable induction and eduction passages, a hydraulic pump for impelling motive liquid through the passages for operating the motor, a tank normally sealed against ingress of motive liquid from the passages, means for cross-connecting the passages through the tank, and a manually controllable partly closable check valve in each of the passages and opening toward the motor and opening away from the tank.

6. The combination with a non-self-starting engine, of a hydraulic pump driven thereby, a hydraulic motor, liquid-carrying conduits connecting the pump to the motor, a pressure reservoir containing a motive liquid and also containing an elastic fluid under minimum pressure above atmospheric pressure and connected to receive motive liquid from one of the conduits during the normal operation of the engine, manually controllable means for admitting motive liquid from the reservoir to the pump for driving the pump as a motor to start the engine, means for preventing the pressure of the elastic fluid from being reduced below the minimum, and means for hydraulically insulating the motor during the engine-starting operation.

7. The combination with a non-self-starting engine, of a hydraulic pump driven thereby, a hydraulic motor, liquid-carrying conduits connecting the pump to the motor, a pressure reservoir containing a motive liquid and also containing an elastic fluid under minimum pressure above atmospheric pressure and connected to receive motive liquid from one of the conduits during the normal operation of the engine, manually controllable means for admitting motive liquid from the reservoir to the pump for driving the pump as a motor to start the engine, means for preventing the pressure of the elastic fluid from being reduced below the minimum, and means for preventing the motive liquid from the pressure reservoir from passing to the motor during the engine-starting operation.

8. The combination with a non-self-starting engine, of a hydraulic pump driven thereby, a hydraulic motor, a pair of liquid-carrying conduits connecting the pump to the motor, a pressure reservoir containing a motive liquid and also containing an elastic fluid under minimum pressure above atmospheric pressure and connected to receive motive liquid from one of the conduits during the normal operation of the engine, manually controllable means for admitting motive liquid from the reservoir to the pump for driving the pump as a motor to start the engine, means for preventing the pressure of the elastic fluid from being reduced below the minimum, an overflow-tank communicating with the other conduit and normally sealed against ingress of liquid therefrom, and manually controllable means for admitting exhaust motive liquid to the overflow-tank.

9. The combination with a non-self-starting engine, of a hydraulic pump driven thereby, a pair of liquid-carrying conduits connecting the pump to the motor, a pressure reservoir containing a motive liquid and also containing an elastic fluid under minimum pressure above atmospheric pressure and connected to receive motive liquid from one of the conduits during the normal operation of the engine, an inwardly opening check valve normally sealing the reservoir to retain the liquid therein, a normally open check valve in the conduit between the pressure reservoir and the motor, manually controllable means for holding the first named valve open to admit motive liquid from the reservoir to the pump to drive the pump as a motor to start the engine and for permitting the last named valve to close to prevent motive liquid from passing from the pressure reservoir to the motor, an automatically operating valve for retaining a liquid seal in the reservoir to prevent the escape of the elastic fluid therefrom, an overflow-tank communicating with the other conduit, and an outwardly opening check valve controlling such communication and normally sealing the overflow-tank against ingress of motive liquid from the conduit, the manually controllable means also holding the overflow-tank controlling-valve open during the time that the reservoir-controlling valve is held open, thereby permitting the motive liquid to exhaust into the overflow-tank during the engine-starting operation.

10. A power-transmission mechanism comprising a prime mover, a rotary pump piston coupled thereto to be driven thereby, a cylinder in which the piston is eccentrically located, a constant-capacity hydraulic motor connected in closed series relation with the pump to receive motive liquid from the pump, mechanism for eliminating the relative eccentricity of the piston and the cylinder, and means arranged to act concurrently with such mechanism for permitting the motor to be freely actuated when the piston and cylinder are concentric with each other.

11. A power-transmission mechanism comprising a prime mover, a rotary pump piston coupled thereto to be driven thereby, a cylinder within which the piston is eccentrically located, a constant-capacity hydraulic motor connected in closed series relation with the pump to receive motive liquid from the pump, mechanism for gradually eliminating the eccentricity and then for gradually producing an eccentricity in the opposite direction, and means connected with such mechanism for concurrent actuation therewith for permitting the motor to be freely actuated when the piston and cylinder are concentric with each other.

12. A power-transmission mechanism comprising a non-self-starting engine, a hydraulic pump driven thereby, a hydraulic motor, a pair of liquid-carrying conduits connecting the pump and the motor in a circulatory system, means for reversing the direction of flow of motive liquid in the conduits without reversing the pump, a single renewal-tank communicating with both of the conduits and containing a reserve supply of motive liquid, normally closed outwardly opening check valves independently controlling the communications between the tank and the conduits, a pressure reservoir containing a motive liquid and also containing an elastic fluid and connected to one of the conduits to receive motive liquid therefrom during the normal operation of the engine, manually controllable means for delivering the stored motive liquid through one of the conduits from the reservoir to the pump for driving the pump as a motor to start the engine, and manually controllable means for holding open that renewal-tank check valve which communicates with the other conduit to permit the motive liquid to exhaust into the renewal-tank during the engine starting operation.

13. The combination with a non-self-starting engine, of a hydraulic pump driven thereby, a hydraulic motor, liquid-carrying conduits connecting the pump to the motor, a pressure reservoir containing a motive liquid and also containing an elastic fluid under minimum pressure above atmospheric pressure and connected to one of the conduits to receive motive liquid therefrom during the normal operation of the engine, manually controllable means for delivering the stored liquid through the same conduit in a reverse direction from the reservoir to the pump for driving the pump as a motor to start the engine, means for preventing the pressure of the elastic fluid from being reduced below the minimum, an overflow-tank communicating with the other conduit and normally sealed against ingress of liquid therefrom, and means for admitting exhaust motive liquid to the overflow-tank.

14. In a motor vehicle, the combination of a non-self-starting engine, a hydraulic pump driven by the engine, a hydraulic motor for propelling the vehicle and connected to receive motive liquid from the pump, means for starting and stopping the motor while the engine is running, hydraulic means for starting the engine without starting the motor, a manually operable lever movable forward and backward from a middle position, manually operable means carried by the lever, for actuating the engine-starting means when the lever is moved backward from its middle position, the lever itself actuating the motor-starting means to propel the vehicle in a forward direction when the lever is moved forward past its middle position after the engine has been started.

15. In a motor vehicle, the combination of a non-self-starting engine, a hydraulic pump driven by the engine, a hydraulic motor for propelling the vehicle and connected to receive motive liquid from the pump, means for starting and stopping the motor while the engine is running, hydraulic means for starting the engine without starting the motor, a manually operable lever movable forward and backward from a middle position, manually operable interlocking means for actuating the engine-starting means when the lever is moved backward from its middle position, the lever itself actuating the motor-starting means to propel the vehicle in a forward direction when the lever is moved forward past its middle position after the engine has been started.

16. In a motor vehicle, the combination of a non-self-starting engine, a hydraulic motor for propelling the vehicle and connected to receive motive liquid from the pump, means for starting and stopping the motor while the engine is running, hydraulic means for starting the engine without starting the motor, a directional brake for acting upon the motive liquid flowing away from the motor regardless of the direction of flow of the motive liquid, a manually operable three-position lever, and manually operable interlocking means, carried by the lever, for actuating the engine-starting means to start the engine when the lever is conjointly placed at its rearward position, the lever actuating the motor-starting means to propel the vehicle in a forward direction when the lever is moved to its forward position, the lever actuating the motor-starting means to drive the motor and the vehicle in a reverse direction when the lever is moved to its rearward position, and the lever acting upon the brake to apply the same when the lever is moved to its intermediate position.

17. In a motor vehicle, the combination of a non-self-starting engine, a hydraulic pump driven by the engine, a hydraulic motor for propelling the vehicle, conduits connecting the pump and the motor, means for starting and stopping the motor while the engine is running, hydraulic means for starting the engine without starting the motor, a directional brake for acting upon the motive liquid flowing away from the motor regardless of the direction of flow of the motive liquid, a manually operable three-position lever, the lever actuating the motor-starting means to propel the vehicle in a forward direction when the lever is moved to its forward position, the lever actuating the motor-starting means to drive the motor and the vehicle in a reverse direction when the lever is moved to its rearward position, and the lever acting upon the brake to apply the same when the lever is moved to its intermediate position, manually operatable interlocking means, carried by the lever, for actuating the engine-starting means to start the engine when the lever is conjointly placed at its rearward position, an overflow-tank communicating with the conduits, means normally sealing the tank against ingress of liquid from the conduits, and means actuated by the lever to actuate the sealing means to open a by-pass for the motor through the overflow-tank during the time that the brake is applied and to permit motive liquid to flow into the overflow-tank during the engine-starting operation.

In testimony whereof I have affixed my signature in presence of two witnesses.

CLYDE J. COLEMAN.

Witnesses:
Wm. A. Kelly,
Bernard Cowen.